Pope & Frazer,
Harness Saddle,
Nº 4,959.
Patented Feb. 5, 1847.
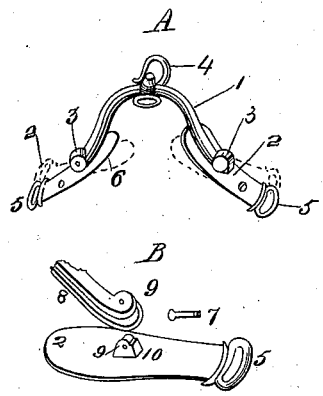

UNITED STATES PATENT OFFICE.

CHARLES POPE AND KASSON FRAZER, OF SYRACUSE, NEW YORK.

HARNESS-SADDLE.

Specification of Letters Patent No. 4,959, dated February 5, 1847.

*To all whom it may concern:*

Be it known that we, CHARLES POPE and KASSON FRAZER, of Syracuse, in the county of Onondaga and State of New York, have invented a new and improved mode of constructing pads in order to their self-adjustment to the form of the animal upon which they may be used; and we do hereby declare that the following is a full and exact description.

The nature of our invention consists in providing the pads 2 which may be used in a harness or saddle, with movable joints 3, which will allow the pads 2 to regulate themselves to the varied condition of the animal. To enable others to make and use our invention we will proceed to describe its construction and operation.

We construct a yoke 1 in such a manner that its center may be over the animal's back, while its extremities are attached to a pad plate 2 on either side; said yoke 1 may be made of metallic, wooden or other suitable substance, and in any form suitable for connecting and sustaining the pad plates 2 in their proper position. We attach a check hook 4, of any of the known forms, to the central part of said yoke 1. We then construct pad plates 2 for the purpose of attaching thereto and supporting the pads. Said pad plates 2 we make of metallic substance, and of sufficient thickness, width and strength to give support to the pads to which they are to be attached. We attach a loop 5 to the lower extremities of said plates 2 to receive the straps. We then attach said pad plates 2 to the extremities of the aforesaid yoke 1 by means of a hinge-joint 3, in such a manner that said pad plates 2 may form a greater or less angle, according to the condition of the animal upon which the whole may be placed. Said joint 3 consists, in part, of a projection or prominence 10 near the center of the upper or outer surface of said pad plates 2, and also, in part, of projections 8 upon the extremities of the aforesaid yoke 1, which pass upon either side of the prominence 10 upon the plate 2 in such a manner as to admit of a screw 7, bolt 7, or pin 7 being passed through 9 the projections 8 upon the yoke 1 and the prominence 10 upon the plate 2, at the same time thereby attaching the plates 2 to the extremities 8 of the yoke 1 and forming a joint 3, which allows said plate 2 to change its position (as shown by dotted lines 6 in the drawing A) when applied to the back of a horse or other animal.

We anticipate varying the construction from that shown in drawing by putting the terrets through the extremities of the yoke 1 instead of the pad plate 2 below; and also contemplate making the yoke 1 of spring steel and giving it a temper so as to allow it to spring, and thus render it more easy to the animal wearing it, if desired. We further anticipate varying the patterns in several minor respects, in order to apply the principle to draft, cart, single and double harnesses, and riding saddles, of the various kinds.

What we claim as our invention or improvement, and desire to secure by Letters Patent, consists in—

The combination of a joint 3 or joints 3 with the pad plates 2 and yoke 1, in the various kinds of harnesses and saddles, so as to allow them to change their angle or position to conform to the shape of the back of the horse or other animal, on which the same may be used, the principle of which is shown substantially in the drawing A, B.

CHAS. POPE.
KASSON FRAZER.

Witnesses:
EDWARD S. DAWSON,
PETER BURNS.